(12) United States Patent
Gardella et al.

(10) Patent No.: US 10,440,989 B2
(45) Date of Patent: Oct. 15, 2019

(54) E-CIGARETTE VAPORIZER CARTRIDGE FILLING METHOD AND APPARATUS

(71) Applicant: Portland Engineering, Inc., Central Point, OR (US)

(72) Inventors: Christopher A. Gardella, Tigard, OR (US); Carl M. Serpa, Vancouver, WA (US); Collin C. Dailey, Portland, OR (US); Michael J. Hogan, Portland, OR (US)

( * ) Notice: Subject to any disclaimer, the term of this patent is extended or adjusted under 35 U.S.C. 154(b) by 134 days.

(21) Appl. No.: 15/349,566

(22) Filed: Nov. 11, 2016

(65) Prior Publication Data

US 2017/0121169 A1    May 4, 2017

(51) Int. Cl.
*B65B 3/04*     (2006.01)
*A24F 47/00*    (2006.01)
*B65D 25/00*    (2006.01)
*G01F 23/00*    (2006.01)

(52) U.S. Cl.
CPC .............. *A24F 47/002* (2013.01); *B65B 3/04* (2013.01); *B65D 25/005* (2013.01); *G01F 23/00* (2013.01)

(58) Field of Classification Search
CPC ...... A24F 47/00; A24F 47/002; A24F 47/008; A24F 15/18; A24F 15/12; A24F 15/14; B65B 3/04; B65D 25/005; H02J 7/025; H02J 7/0042; H02J 7/0052; H02J 7/0044; G01F 23/00; G09F 2023/0025
USPC ............... 131/328, 329, 361; 320/107–108
See application file for complete search history.

(56) References Cited

U.S. PATENT DOCUMENTS

| | | | | |
|---|---|---|---|---|
| 7,010,900 | B2 * | 3/2006 | Grossmann | A61L 2/208 134/169 R |
| 7,497,237 | B2 * | 3/2009 | Till | A61L 2/22 141/11 |
| 9,247,773 | B2 * | 2/2016 | Memari | A24F 15/12 |
| 9,320,301 | B2 * | 4/2016 | Memari | A24F 15/12 |
| 9,668,522 | B2 * | 6/2017 | Memari | A24F 15/12 |
| 9,848,647 | B2 * | 12/2017 | Memari | A24F 15/12 |
| 9,848,648 | B2 * | 12/2017 | Memari | A24F 15/12 |
| 9,883,697 | B2 * | 2/2018 | Memari | A24F 15/12 |
| 9,955,736 | B2 * | 5/2018 | Memari | A24F 15/12 |
| 9,955,737 | B2 * | 5/2018 | Memari | A24F 15/12 |
| 9,986,770 | B2 * | 6/2018 | Memari | A24F 15/12 |
| 9,993,029 | B2 * | 6/2018 | Memari | A24F 15/12 |
| 9,993,030 | B2 * | 6/2018 | Memari | A24F 15/12 |
| 9,993,031 | B2 * | 6/2018 | Memari | A24F 15/12 |
| 9,993,032 | B2 * | 6/2018 | Memari | A24F 15/12 |
| 9,993,033 | B2 * | 6/2018 | Memari | A24F 15/12 |
| 9,999,259 | B2 * | 6/2018 | Memari | A24F 15/12 |
| 9,999,260 | B2 * | 6/2018 | Memari | A24F 15/12 |
| 10,015,995 | B2 * | 7/2018 | Memari | A24F 15/12 |

(Continued)

*Primary Examiner* — Nicolas A Arnett
(74) *Attorney, Agent, or Firm* — Birdwell & Janke, LLP

(57) ABSTRACT

An e-cigarette vaporizer cartridge filling method and apparatus. The apparatus includes a liquid reservoir having an outlet end, the liquid reservoir for containing the liquid, a heater for heating the liquid in the liquid reservoir, and a liquid injection mechanism configured to draw portions of the heated liquid from an outlet end of the liquid reservoir and dispense the portions from an output end of the liquid injection mechanism. The method may allow for a human operator to control the time for filling the liquid injection mechanism with liquid based on visual observation of bubble formation and collapse therein.

48 Claims, 6 Drawing Sheets

(56) References Cited

U.S. PATENT DOCUMENTS

| | | | |
|---|---|---|---|
| 10,015,996 B2* | 7/2018 | Memari | A24F 15/12 |
| 10,021,916 B2* | 7/2018 | Memari | A24F 15/12 |
| 10,028,536 B2* | 7/2018 | Memari | A24F 15/12 |
| 10,045,565 B2* | 8/2018 | Memari | A24F 15/12 |
| 10,045,566 B2* | 8/2018 | Memari | A24F 15/12 |
| 10,070,662 B2* | 9/2018 | Gorilovsky | A24B 15/167 |
| 10,081,531 B2* | 9/2018 | Murison | B67D 7/36 |
| 10,091,839 B2* | 10/2018 | Murison | A24F 15/18 |
| 10,092,035 B2* | 10/2018 | Memari | A24F 15/12 |
| 10,099,916 B2* | 10/2018 | Murison | H05B 1/0227 |
| 10,130,119 B2* | 11/2018 | Murison | A24B 15/167 |
| 10,131,532 B2* | 11/2018 | Murison | H05B 1/0227 |
| 10,136,674 B2* | 11/2018 | Murison | H02J 7/0044 |
| 10,138,113 B2* | 11/2018 | Murison | H05B 1/0227 |
| 10,143,235 B2* | 12/2018 | Memari | A24F 47/008 |
| 2002/0159915 A1* | 10/2002 | Zelina | A61L 2/186 422/3 |
| 2004/0237466 A1* | 12/2004 | Grossmann | A61L 2/208 53/167 |
| 2006/0005896 A1* | 1/2006 | Till | A61L 2/22 141/147 |
| 2006/0011262 A1* | 1/2006 | Stienen | A61L 2/208 141/147 |
| 2010/0276034 A1* | 11/2010 | Gonnelli | A61J 1/2089 141/18 |
| 2012/0167906 A1* | 7/2012 | Gysland | A24F 47/008 131/328 |
| 2013/0284192 A1* | 10/2013 | Peleg | A24F 47/002 131/329 |
| 2015/0053217 A1* | 2/2015 | Steingraber | A24F 47/008 131/329 |
| 2015/0245654 A1* | 9/2015 | Memari | A24F 15/12 141/2 |
| 2016/0150824 A1* | 6/2016 | Memari | A24F 15/12 131/329 |

* cited by examiner

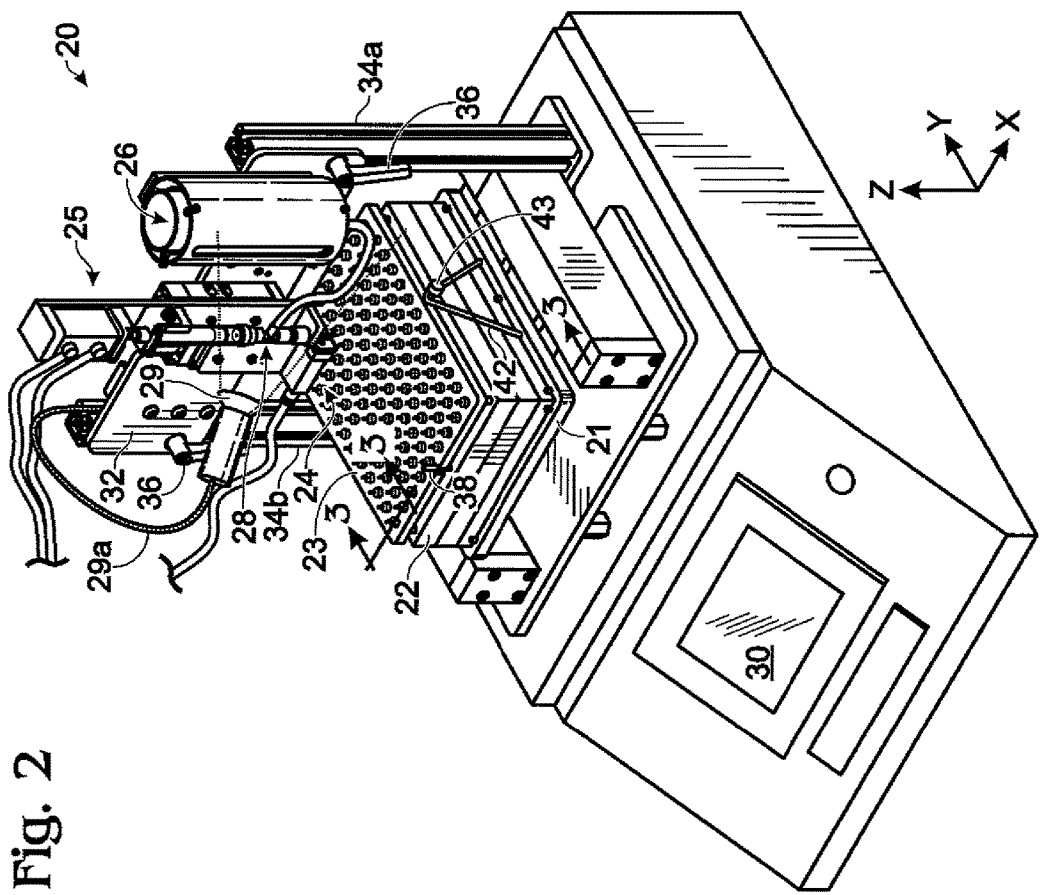

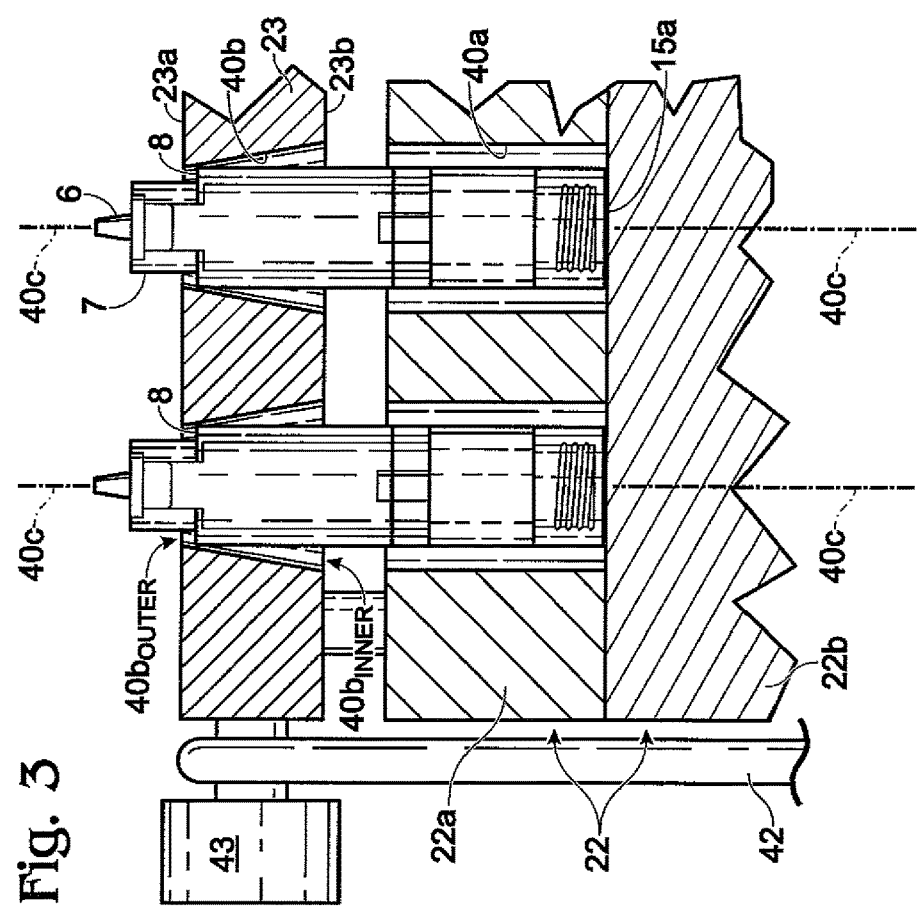

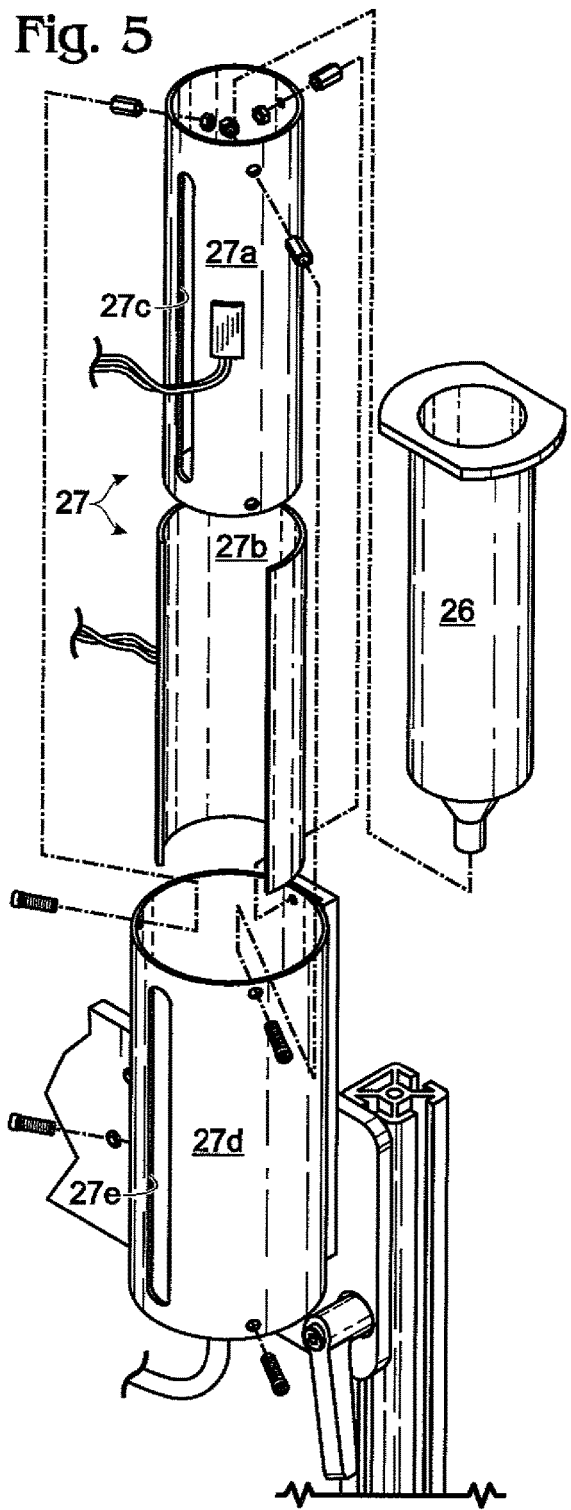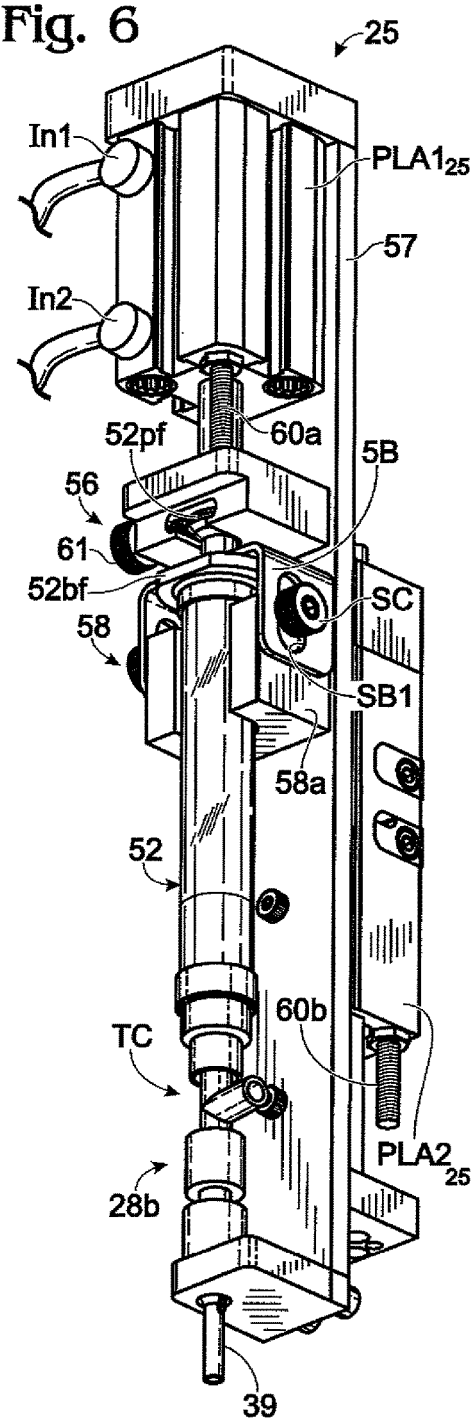

E-CIGARETTE VAPORIZER CARTRIDGE FILLING METHOD AND APPARATUS

FIELD OF THE INVENTION

The present invention relates to a method and apparatus for filling vaporizer cartridges which are used in electronic or e-cigarettes, with the liquids from which the desired vapors are produced.

BACKGROUND

E-cigarettes are commonly used for producing vapors for inhalation for recreational and medicinal purposes. There are three basic components of the e-cigarette: a battery, a mouthpiece, and a vaporizer cartridge (hereinafter "cartridge") having two ends, one of which is removably attached to the battery and the other of which is removably attached to the mouthpiece. The cartridges are not wholly standardized and vary somewhat in configuration.

FIG. 1 shows an exemplary vaporizer cartridge 2 having a reservoir 3 and a fill opening 4 at a distal end 5 of the cartridge. The fill opening 4 is plugged with a removable stopper 6 having a stopper stem 6a. The cartridge is, and each of its constituent parts are, essentially radially symmetric about a centerline CL passing through the stopper stem. The fill opening 4 is provided through and the reservoir is provided in a cartridge stem 7 which protrudes from a ledge 8 at the distal end 5 of the cartridge.

The reservoir 3 is in fluid communication with a wick 11 disposed at a base end 3a of the reservoir. The wick conducts small amounts of the liquid in the reservoir into a vapor passageway 9 that is open to the atmosphere at a vapor outlet opening 9a proximate the fill opening 4 in the cartridge stem 7. The mouthpiece is connected to the cartridge over the stem 7 and therefore over the vapor outlet opening 9a.

The bulk of the reservoir 3 and the vapor passageway 9 is contained within a cartridge body portion 10 of the cartridge. Also contained within the cartridge body portion 10 is a heating element (not shown) proximate the wick, for heating liquid conducted by the wick and thereby vaporizing it.

The body of the e-cigarette contains a battery for powering the heater in the vaporizer cartridge, and may also contain a pressure switch which applies power to the heater only when the user creates low pressure at the vapor outlet opening 9a of the cartridge, by inhaling on the mouthpiece.

A threaded boss 14 extends from a base end 2a of the cartridge for threadably connecting the cartridge to the body. The threaded boss is typically protected by a removable cap 15, the bottom of which defines a bottom-most surface 15a of the cartridge.

Small air holes 13 are provided through the boss 14 (underneath, not visible in FIG. 1), extending into the vapor passageway to allow for drawing the vapors out of the vapor passageway and out the vapor outlet opening 9a.

The stopper 6, stem 7, body portion 10, and cap 12 are generally cylindrical and centered about a cylindrical axis "A." The stopper stem 6a is also centered on the same axis.

The cartridge body portion 10 has an outer diameter $D_1$, the cartridge stem 7 has an outer diameter $D_2$ which is less than the diameter $D_1$, the cap 12 has an outer diameter $D_3$ which varies so that it may be equal to or greater than the diameter $D_1$. The stopper stem 6a is not necessarily or radially symmetric, but has a width or thickness that can be approximated as an outer diameter $D_4$.

The cartridge 2 ready to fill, with the stopper removed but with the cap 15, has an overall length "L."

Typically, the cartridge 2 is filled manually. The stopper 6 is manually removed by gripping the stopper stem 6a and pulling, the liquid to be introduced into the reservoir 3 is manually injected through the fill opening 4 by use of a syringe, and the stopper is manually replaced by gripping the stopper stem 6a and pushing.

It is an object of the present invention to provide for a judicious use of automation in the filling process.

SUMMARY

An e-cigarette vaporizer cartridge filling method and apparatus is disclosed herein. One disclosed apparatus, for filling at least one e-cigarette vaporizer cartridge with liquid, may include a liquid reservoir having an outlet end, the liquid reservoir for containing the liquid, a heater for heating the liquid in the liquid reservoir, and a liquid injection mechanism. For filling at least one e-cigarette vaporizer cartridge, the liquid injection mechanism may be configured for drawing a portion of the heated liquid from an outlet end of the liquid reservoir and dispensing the portion of heated liquid from an output end of the liquid injection mechanism. In another disclosed apparatus, for filling a plurality of e-cigarette vaporizer cartridges with liquid, the liquid injection mechanism may be configured for sequentially drawing multiple portions of the heated liquid from the outlet end of the liquid reservoir and sequentially dispensing the multiple portions of heated liquid from the output end of the liquid injection mechanism.

It may be provided that the liquid must travel no farther than about 10 inches, more preferably no farther than about 8 inches, and still more preferably no more than about 7 inches between the outlet end of the liquid injection mechanism and the output end of the liquid reservoir.

The apparatus may include a liquid delivery and flow control element having a dispense outlet and one or more check valves, the liquid injection mechanism drawing one or more portions of heated liquid through the liquid delivery and flow control element and dispensing the one or more portions of heated liquid through the dispense outlet, wherein the one or more check valves allow for the heated liquid to flow from the liquid reservoir to the liquid injection mechanism but not the reverse, and wherein the one or more check valves further allow for the heated liquid to flow from the output end of the liquid injection mechanism and out the dispense outlet but not the reverse.

Where the one or more check valves have an input end for receiving incoming liquid flow, the apparatus may further include a length of hollow tubing for conducting the heated liquid from the outlet end of the liquid reservoir to the input end of the one or more check valves. The length of the tubing is preferably no more than about 8 inches, more preferably no more than about 6 inches, and still more preferably no more than about 5 inches.

Where the apparatus includes a liquid delivery and flow control element, the apparatus may include one or more auxiliary heating devices adapted to produce primarily radiant heat, each of the one or more auxiliary heating devices being disposed at ends of respective support members allowing at least 5 degrees of freedom of adjustment of the respective auxiliary heating devices so that the auxiliary heating devices may be selectably arranged to be in close proximity to the liquid delivery and flow control element generally, or the tubing more specifically, and so that the heat energy produced thereby may be aimed at or focused on the liquid delivery and flow control element generally, or the tubing more specifically.

The apparatus may further include an X-Y positionable element, a controller for controlling the X-Y position of the X-Y positionable element, and a tray with a plurality of wells, the wells adapted for holding respective ones of the cartridges in respective filling positions, the wells arranged in a pattern defining a regular X-Y array, either the liquid injection mechanism or the tray being carried by the X-Y positionable element and therefore being X-Y positionable as a result of control exerted by the controller upon the X-Y positionable element so as to provide for sequentially performing a series of steps of receiving the dispensed portions of heated liquid by the respective ones of the cartridges.

Where the apparatus includes an X-Y positionable element, the apparatus may include a stopper remove-and-replace mechanism having a carriage carrying a set of opposable jaws, the jaws adapted for sequentially closing and thereby sequentially performing a series of steps of gripping the stoppers of the respective ones of the cartridges, the carriage adapted for elevating after each step of gripping and thereby sequentially performing a series of steps of removing the stoppers from the respective ones of the cartridges, the carriage further adapted for de-elevating after each step of removing and thereby sequentially performing a series of steps of re-installing the stoppers in the respective ones of the cartridges, the jaws further adapted for opening after each step of re-installing and thereby sequentially performing a series of steps of releasing the stoppers of the respective ones of the cartridges, the controller configured to provide that each one of the steps of receiving be preceded by a corresponding one of the steps of removing and followed by a corresponding one of the steps of re-installing.

Also where the apparatus includes an X-Y positionable element, the apparatus may include a cartridge alignment guide having a first side and an opposite, second side which is parallel to the first side, and a plurality of holes extending through the cartridge alignment guide from the first side to the second side, the holes arranged in substantially the same pattern as the wells of the tray, each hole defining a larger void surface area on the first side than on the second side. Further, the holes may have respective hole axes about which the holes are centered, the holes defining in a progressive sequence of cross-sections of the cartridge alignment guide taken perpendicular to the respective hole axes, either progressively increasing or progressively decreasing void areas.

One disclosed method for filling at least one e-cigarette vaporizer cartridge with liquid may include steps of providing a liquid reservoir having an outlet end, the liquid reservoir for containing the liquid, heating the liquid in the liquid reservoir to a temperature of at least about 100 degrees Fahrenheit so as to produce heated liquid using primarily conductive heat transfer, drawing a portion of the heated liquid from the outlet end of the liquid reservoir through a delivery and flow control element, heating the portion of heated liquid while the portion of heated liquid is in the delivery and flow control element using primarily radiant heat transfer, and dispensing the portion of heated liquid into the at least one e-cigarette vaporizer cartridge.

The step of drawing occurs over a period of time and may be sequentially repeated for filling a plurality of e-cigarette vaporizer cartridges, in which case the method may further include performing a step of visual observation of the formation and collapse of bubbles in at least one of the drawn portions of heated liquid, and adjusting the periods of time in response to the visual observation.

Another disclosed method, for filling a plurality of e-cigarette vaporizer cartridges with liquid, may include steps of providing a liquid reservoir having an outlet end, the liquid reservoir for containing the liquid, heating the liquid in the liquid reservoir to a temperature of at least about 100 degrees Fahrenheit so as to produce heated liquid, sequentially drawing multiple portions of the heated liquid from the outlet end of the liquid reservoir through a delivery and flow control element over respective periods of time, performing a step of visual observation of the formation and collapse of bubbles in at least one of the sequentially drawn portions of heated liquid, and adjusting the periods of time in response to the visual observation.

The steps of performing a visual observation and adjusting the periods of time may be, but are not necessarily, performed by a human.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF DRAWINGS

FIG. 1 is an isometric view of an exemplary style of e-cigarette vaporizer cartridge.

FIG. 2 is an isometric view of an e-cigarette vaporizer cartridge filling apparatus 20 according to the present invention, set up for filling a plurality of cartridges of the type shown in FIG. 1.

FIG. 3 is a cross-sectional view of a cartridge alignment guide according to the present invention.

FIG. 4 is an elevation view of a liquid injection syringe, a liquid reservoir, and a liquid delivery and flow control element, provided and coupled together according to the present invention.

FIG. 5 is an exploded isometric view of a reservoir heating element according to the present invention.

FIG. 6 is an isometric view of a liquid injection mechanism according to the present invention.

DETAILED DESCRIPTION OF PREFERRED EMBODIMENTS

Figure 7:
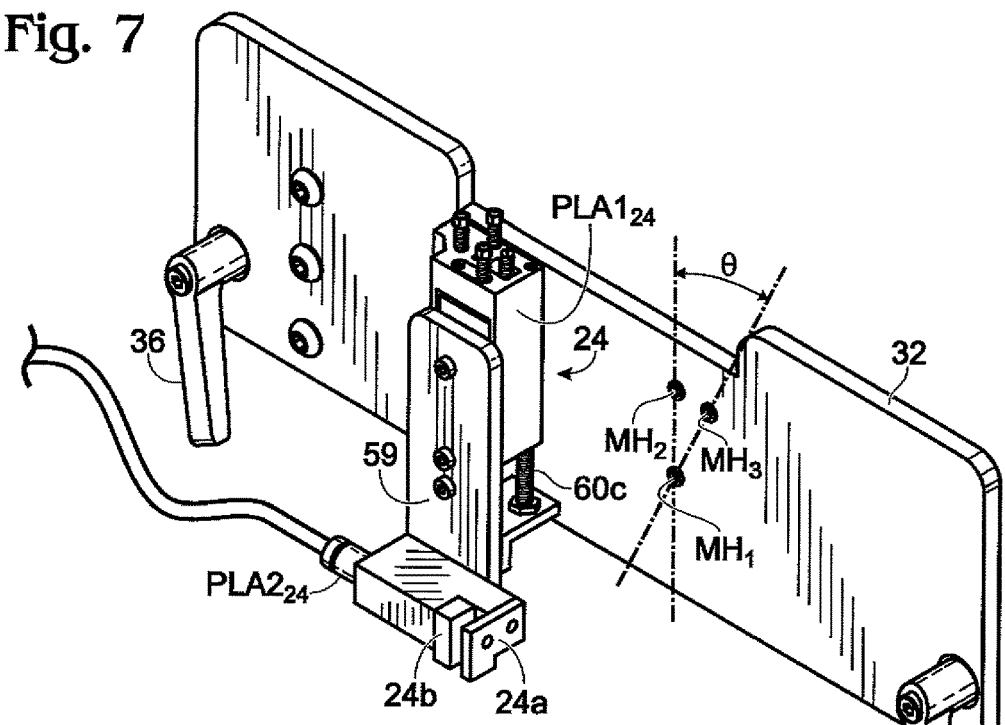
FIG. 7 is an isometric view of a stopper remove-and-replace mechanism according to the present invention.

FIG. 2 shows an e-cigarette vaporizer cartridge filling apparatus 20 according to the present invention. The filling apparatus 20 includes an automatically X-Y positionable table 21, a cartridge tray 22, a cartridge alignment guide 23, a stopper remove-and-replace mechanism 24, a liquid injection mechanism 25, a liquid reservoir 26, a reservoir heating element 27 (see FIG. 5; not visible in FIG. 2), a liquid delivery and flow control element 28, and an auxiliary heater 29.

The apparatus 20 includes a controller (not shown) which may be a standard programmable computer or other state machine for controlling the apparatus to perform as described herein, and which is responsive to user input via a user-interface 30. The apparatus may also include various sensors such as described further below to which the controller is responsive. Responsive to available inputs the controller controls the operation of the X-Y table 21, the stopper remove-and-replace mechanism 24 and the liquid injection mechanism 25, and the controller may be used to control the temperature of the reservoir heating element 27, if this is not separately provided for. The controller also includes a timer for performing one or more timing functions as described herein.

Briefly, the vaporizer cartridge filling apparatus 20 injects liquid stored in the liquid reservoir 26, sequentially, into an array of cartridges held by the cartridge tray 22 and cartridge alignment guide 23. In a typical cycle, a load of liquid is withdrawn from the reservoir 26 by, and is held within, the liquid injection mechanism 25. An empty cartridge to be filled and having a stopper is moved by translation of the X-Y table into position to be manipulated by the stopper remove-and-replace mechanism 24, which removes and retains the stopper. Then the X-Y table increments the position of the cartridge so that it is in position for the liquid injection mechanism 25 to inject the liquid held therein into the cartridge. Then the X-Y table decrements the position of the cartridge so that it is once again in position to be manipulated by the stopper remove-and-replace mechanism 24, which reinstalls the stopper.

A standard X-Y table is automatically positionable at selectable X, Y locations by command of a controller, and for use in the present invention the X, Y locations are preferably discrete and predetermined, and moreover are preferably provided at regular intervals in both the X and Y directions, defining a "regular array" of X, Y locations. Such an X-Y positionable element preferably provides for automatic control of the X, Y positions, but it could be adapted for manual control, such as where the table is provided with a series of detents that tend to retain the table at discrete predetermined X, Y locations.

The stopper remove-and-replace mechanism 24, the liquid injection mechanism 25, and the liquid reservoir 26, and therefore the reservoir heating element 27 as well, are preferably kept in close proximity, and are mounted to a gantry 32 which is slidably mounted to support posts 34a, 34b for elevation adjustment relative to the X-Y table 21. This is to allow for filling cartridges of varying heights L.

Both the stopper remove-and-replace mechanism 24 and the liquid injection mechanism 25 are reciprocated along respective lines of "stroke," which with reference to the X-Y-Z coordinate system indicated, is oriented in the Z direction, perpendicular to the plane of translation of the X-Y table.

Standard locking means 36 are provided for locking the gantry at a desired elevation relative to the fill openings 4 of the cartridges, the term "elevation" being used to refer to distances along the Z axis, and not being intended to imply a particular orientation of the apparatus.

The X-Y table 21 may be any off-the-shelf component, such as that manufactured and marketed by the Festo corporation having US headquarters in Hauppauge, N.Y., as part number 2226101. As is typical, this particular X-Y table is electrically powered by stepper motors. The X-Y table is configured or adapted to include alignment pins 38 (only one is visible) for defining space thereon for receiving the cartridge tray 22 with a close fit, to index the cartridge tray to a known position. This allows the computer to control the X-Y table to position each cartridge, in programmed sequence, in line with the strokes of the stopper remove-and-replace mechanism 24 and the liquid injection mechanism 25 respectively.

Referring in addition to FIG. 3, the cartridge tray 22 has an array of holes 40a for receiving the cartridges as shown in FIG. 2. The holes 40a are provided in a regular array. As a consequence, fixed increments of movement of the X-Y table 21 in the X direction, and/or fixed increments of movement of the X-Y table in the Y direction (together "fixed X-Y table increments"), will result in moving any given cartridge that was disposed under and aligned with the stopper remove-and-replace mechanism 24, so that the same cartridge becomes disposed under and aligned with the liquid injection mechanism 25, and vice versa.

The cartridge tray 22 may be provided in two pieces, a body portion 22b through which the holes are bored, and a support portion 22a for supporting the bottom-most surfaces 15a of the cartridges. The support portion 22a may be removably attached to the body portion 22b for easy cleaning of the wells created by combining the two portions.

The cartridge tray 22 may be formed of any desired solid material, including metal, plastic, ceramic (including glasses), or combinations thereof. In a preferred embodiment, the cartridge tray is formed of the plastic polyoxymethylene, a commercial form of which is marketed as Delrin.

The holes 40a of the cartridge tray 22 should have diameters that are at least equal to the aforementioned cap 12 diameter $D_3$. Since in practice the cap diameters can vary, the holes 40 may be significantly larger, e.g., up to about 10% larger, than the largest outer diameters of the cartridges. One consequence of this looseness is that the cartridges may not be adequately aligned for filling. Another is that pulling on the stoppers 6 of the cartridges to remove the stoppers may result in simply lifting the cartridge from the tray.

Turning to FIG. 3, the cartridge alignment guide 23 has opposed top and bottom sides 23a and 23b, and a plurality of holes 40b extending through the cartridge alignment guide from the top side to the bottom side. The holes have respective hole axes 40c. The holes correspond to and are aligned with the holes 40a, being arrayed in the same pattern. The cartridge alignment guide 23 may be particularly configured or adapted for use with the cartridge 2 by providing that the holes are frustoconically shaped as shown. For purposes herein, a "frustoconical" shape includes truncated cone shapes that are not smooth, e.g., they may have steps or ridges.

Ends $40b_{INNER}$ of the holes 40b, which are closest to the cartridge tray 22 when the cartridge alignment guide 23 is installed over the cartridge tray 22 as shown in FIG. 1, have a diameter that is large enough to pass the ledges 8 of the cartridges; whereas the opposite ends $40b_{OUTER}$ are large enough to pass the cartridge stems 7 but are not large enough to pass the ledges 8. The size differences in the opposite ends of the holes 40b provides for retaining the cartridges in the tray 22 when the stoppers are being pulled away from the cartridges, and the frustoconical shape of the holes 40b in particular provides for exerting radially symmetric forces on the ledges 8 to facilitate centering the cartridges in the holes 40a.

The cartridge alignment guide 23 may be formed of a material that is heavy enough to provide for both of the aforementioned functions simply by laying it on top of the cartridge stems. However, it has been found to be generally desirable to form the cartridge alignment guide of lighter materials and to clamp or bias the cartridge alignment guide to or toward the cartridge tray, such as by use of elastic bands 42 (FIG. 2) passing over shoulder screws 43 that extend from the cartridge tray. The elastic bands 42 provide for a high degree of flexibility of adjustment in the spacing between the cartridge alignment guide and the cartridge tray, which is desirable for accommodating cartridges of varying heights L.

For purposes of definition, an elastic band is an elongate element which is capable of elastically, i.e., recoverably, stretching at least 150%, and preferably at least 200%, at room temperature.

Turning now to FIG. 4, it has been found convenient to use, as the liquid reservoir 26, the body portion of an off-the-shelf medical syringe, more particularly a 140 cc syringe with a "Luer Lock" tip marketed by Covidien Ltd. of Dublin, Ireland, as part number 8881114030. It is advantageous that this part is autoclavable.

Turning to FIG. 5, the liquid reservoir 26 is installed inside the reservoir heating element 27, to heat the liquid in the reservoir, for the purpose of lowering its viscosity so that the liquid can more easily be withdrawn from the reservoir and injected into the cartridges. It is particularly important to lower the viscosity of the liquid if the liquid is a *cannabis oil*.

FIG. 5 shows a preferred embodiment of the heating element 27. It has a thermally conductive tube 27a, which is preferably but not necessarily formed of metal, of slightly larger diameter than that of the liquid reservoir 26, which is wrapped with or surrounded by a heating device 27b such as a 50 Watt silicone heating pad. The thermally conductive tube provides for conductive heat transfer from the heating device 27a to the reservoir 26.

The heating element 27 is preferably capable of maintaining a temperature of the fluid in the reservoir 26 of at least 100, more preferably at least 120, and still more preferably at least 140, degrees Fahrenheit in an indoor environment which is maintained at an ambient temperature of 70 degrees.

The thermally conductive tube 27a is preferably not wrapped or surrounded entirely by the heating device 27b, and preferably has an uncovered elongate slot 27c to provide a viewing port for viewing the level of liquid in the liquid reservoir 26. A resistance temperature detector (RTD) or other temperature measuring device may be attached to the tube 27a for monitoring the temperature of the heating element 27 and providing that information to the controller, or to an additional temperature control circuit, for controlling the temperature of the heating element 27.

The heating element 27 preferably has a guard 27d for shielding users of the device from the heating device 46. The guard 27d may be another tube concentrically disposed about and spaced apart from the thermally conductive tube 27a. The guard 27d preferably includes an elongate slot 27e aligned with and corresponding to the slot 27c in the thermally conductive tube 27a, so that the level of liquid in the reservoir 26 can be seen through both the guard and the thermally conductive tube.

FIG. 6 shows a preferred embodiment of the liquid injection mechanism 25. For durability, a high quality glass syringe 52 (also shown in FIG. 4) is preferably employed as a "liquid injection syringe" for use in the mechanism 25. A 5 ml. analytical syringe obtained from SGE Analytical Science, a part of Trajan Scientific and Medical, of Ringwood, Victoria Australia, has been found to work well as a liquid injection syringe.

With reference to FIG. 4 and for reference further below, the liquid injection syringe 52 has a body 52a and a plunger 52b; the body 52a has a body flange 52bf, and the plunger 52b has a corresponding plunger flange 52pf, which are typically used as finger and thumb holds for manually operating the syringe.

In FIG. 4, the liquid injection syringe 52 is shown apart from the liquid injection mechanism 25, but connected to the liquid reservoir 26 through the liquid delivery and flow control element 28. The liquid delivery and flow control element 28 includes a length of tubing 43, preferably autoclavable silicone tubing, connecting an outlet end 26a of the liquid reservoir 26 to the input end of a first check valve 28a that allows for passing liquid from the reservoir 26 to the syringe but not the reverse.

The output end of the first check valve 28a is connected to a first leg L1 of a standard T-connector "TC." A second leg L2 of the T-connector is connected to a syringe output end 53 of the liquid injection syringe 52, to provide for conveying the liquid passing through the check valve 28a to the syringe as a result of pulling the plunger 52b away from the body 52a. This allows for drawing, into the syringe, a desired amount of liquid from the liquid reservoir 26 for dispensing into a cartridge.

The third leg L3 of the T-connector is connected to the input end of a second check valve 28b. The output end of the check valve 28b defines a dispense outlet of the liquid delivery and flow control element 28, and is attached to a hollow needle 39 for insertion into the fill opening of the cartridge.

The second check valve 28b is closed while liquid is being drawn through the first check valve 28a into the syringe, and therefore while the first check valve 28a is open, to prevent air from being drawn into the syringe through the dispense outlet, but opens while liquid is being expelled from the syringe, and therefore while the first check valve 28a is closed. As a consequence, the second check valve allows for passing liquid from the output end of the liquid injection mechanism and out the dispense outlet but not the reverse.

All of these components may be obtained as standard off-the-shelf parts used in the medical industry. All connectors may be provided with Leur tapers or "Leur Locks" to prevent leaks. It is also possible to provide a single check valve that performs the functions of the two check valves described above.

It is preferable to minimize the length of the tubing 43 by locating the liquid reservoir 26 as close as is practical to the output end 53 of the liquid injection syringe 52, to minimize both head and heat loss. Preferably, these components are in such proximity that liquid exiting the liquid reservoir 26 at the outlet end 26a need travel no farther than about 10 inches, more preferably no farther than about 8 inches, and more preferably still no farther than about 7 inches, to enter the output end 53 of the syringe. Considering that there is some length of travel imposed by the first check valve 28a and the associated portion of the T-connector, corresponding preferred lengths of the tubing 43, in order of increasing preference, are no more than about 8 inches, 6 inches, and 5 inches respectively.

Likewise, the distance liquid must travel from the output end 53 of the syringe to the needle 39 is preferably minimized. In the preferred embodiment shown that distance is minimal, being established by the length of the T-connector and the check valve 28b.

Returning to FIG. 1, the auxiliary heater 29 is for heating the liquid delivery and flow control element 28, to maintain the desired viscosity reduction provided by the reservoir heating element 27 all the way to the liquid injection syringe 52. It has been found that a gooseneck lamp equipped with a 50 Watt incandescent "heat lamp" bulb can provide the desired heat, the stem 29a thereof providing a convenient means for both directing the heat where it is needed while the cartridge filling apparatus is in use, and stowing the heating element out of the way when the apparatus is being serviced or maintained. It has been found to be particularly desirable to use the auxiliary heater 29 to heat the length of tubing 43 between the liquid reservoir 26 and the first check valve 28a.

The stem 29a of a gooseneck lamp provides for 6 degrees of freedom of adjustment of the lamp's position and orientation; however, sufficient capability could be provided with only 5 degrees of freedom of adjustment, 3 in translation and 2 in rotation. Preferably, the stem 29a of the auxiliary heater 29 is long enough, and/or is mounted close enough, to the tubing to allow the lamp to be spaced in close proximity to the tubing, such as within about 4 inches, and so that the heat energy produced by the auxiliary heater can be aimed at or focused on the tubing 43.

For purposes herein, it is assumed that the heat energy from the heater is maximum at a center of distribution and falls away with increasing radial distance from that center. In such case, the heat energy produced by the heater is aimed at the tubing if the center of distribution falls on some portion of the tubing, preferably a portion that is between a point on the check valve 28a and a point on the tubing that is half-way along the total length of the tubing, and more preferably at a portion that is between a point on the check valve 28a and a point on the tubing that is between 5/8 and 7/8 of the way along its length.

More than one auxiliary heater may be employed to allow for better focusing of the heat and therefore less wasted or unwanted heat and a lower heat energy requirement. For example, two gooseneck lamps may be employed, with the stems thereof being mounted on opposite sides of the liquid injection mechanism 25.

Returning to FIG. 6, the liquid injection mechanism 25 includes a receiver 56 for receiving the plunger flange 52pf, and a receiver 58 for receiving the body flange 52bf. One of these components may have a fixed recess shaped to fit the corresponding flange, while the other may have an adjustably sized recess, adjustable in the direction of stroke of the syringe, and therefore the stroke of the liquid injection mechanism 25 (hereinafter the "direction of the stroke"), to facilitate installation of the liquid injection syringe 52 in the liquid injection mechanism 25. In the embodiment shown, the receiver 58 has the fixed recess and the receiver 56 has the adjustable recess, provided by a slotted bracket "SB" and screws "SC" threaded into a body portion 58a of the receiver 58. A locking screw may be provided in one or the other or both of the receivers for locking the syringe in place; shown is such a locking screw 61 for locking the plunger flange 52f in the receiver 56.

The receivers 56 and 58 are both mounted on a carriage 57 that allows them to move relative to each other in the direction of the stroke, to provide for operating the syringe in the manner that it would normally be operated by a human user. In the preferred embodiment illustrated, the receiver 58 moves while the receiver 56 remains fixed, and an adjustable set-screw 60a provides a hard limit on the travel of the receiver 58 relative to the receiver 56. If the spacing between the two receivers is increased, the syringe is enabled to draw liquid from the liquid reservoir 26, and if the spacing between the two receivers is decreased, the syringe is enabled to expel the liquid that has been withdrawn from its output end 53.

The carriage 57 can also be moved in the direction of the stroke, so that the receivers 56 and 58 can move as a group, to provide for inserting the needle of the syringe into the cartridge to commence filling the cartridge, and withdrawing the needle of the syringe from the cartridge after it has been filled. An adjustable set-screw 60b provides a hard limit on the travel of the carriage 57.

Both the movement of one receiver relative to the other on the carriage, and the movement of the carriage so as to provide for moving both receivers together as a group, may be pneumatically powered, by use of standard pneumatic linear actuators. Shown is a first pneumatic linear actuator $PLA1_{25}$, for moving the receiver 56 relative to the receiver 58, and a second pneumatic linear actuator $PLA2_{25}$, for moving the carriage 57. Both pneumatic actuators are provided with a source (not shown) of compressed air, and the actuator $PLA1_{25}$ in particular shows that such actuators have, generally, two air inputs "In1" and "In2."

The linear actuator $PLA1_{25}$ may advantageously be obtained with an adjustable needle valve for adjustably controlling the flow of air into the actuator so as to provide for adjusting the speed with which the receiver 56 moves toward the receiver 58, and thereby dispenses liquid from the syringe 52. This adjustment is generally desirable where liquids of different viscosities are being dispensed with the same apparatus. For example, it has been found that a dispense speed that is appropriate for a one liquid may cause a liquid of lower viscosity to splash back as the cartridge is being filled, calling for a reduction in the dispense speed.

FIG. 7 shows the stopper remove-and-replace mechanism 24. It has two jaws 24a and 24b mounted to a carriage 59 that allows them to move relative to each other perpendicular to the direction of the stroke, to provide for gripping and releasing the stopper stem 6a of the cartridge. For purposes herein, gripping the stem portion of a stopper may be referred to as gripping the stopper.

It is advantageous to provide that the jaw nearest the liquid injection mechanism 25, here the jaw 24a, is fixed to the carriage 59, and is disposed as close as is practical to the liquid injection mechanism 25, to allow for a denser array of cartridges in the cartridge tray 22. The remaining jaw 24b is moveable. An adjustable set-screw 60c provides a hard limit on the travel of the jaw 24b.

The carriage 59 can also be moved in the direction of the stroke, so that the jaws 24a and 24b can move as a group, to provide for positioning the jaws relative to the stopper stem 6a. An adjustable set-screw 60c provides a hard limit on the travel of the carriage 59.

Both the movement of one jaw relative to the other on the 59, and the movement of the carriage itself so as to provide for moving both jaws together as a group, may be pneumatically powered, by use of standard pneumatic linear actuators. Shown is a first pneumatic linear actuator $PLA1_{24}$, for moving the moveable jaw 24b relative to the fixed jaw 24a, and a second pneumatic linear actuator $PLA2_{24}$, for moving the carriage 59.

FIGS. 8-11 show a sequence of operation of the stopper remove-and-replace mechanism 24 and the liquid injection mechanism 25.

Figure 8:
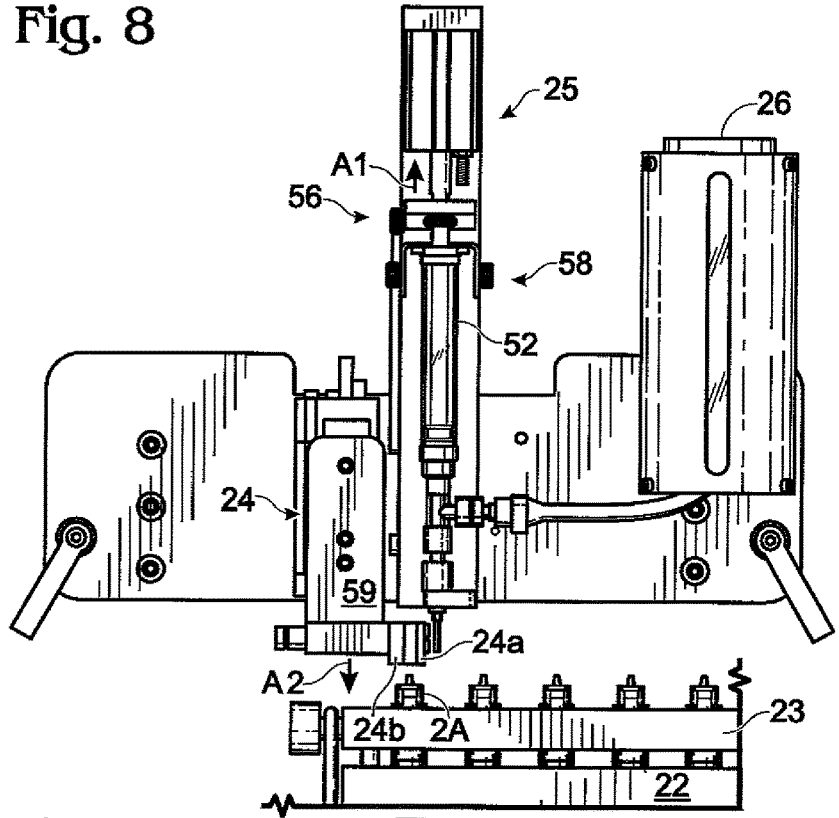
FIG. 8 is a broken elevation view of the apparatus of FIG. 2, at a first instant of operation thereof according to the invention.

In FIG. 8, both the carriage 59 of the stopper remove-and-replace mechanism 24 and the carriage 57 of the liquid injection mechanism 25 are initially in elevated positions, prior to filling a particular cartridge 2A.

As indicated by the arrow "A1" in FIG. 8, the receiver 56 is elevated relative to the receiver 58 for drawing a load of liquid is into the syringe 52 from the reservoir 26. But before the cartridge can be filled, the stopper of the cartridge must be removed. To accomplish this automatically, the X-Y table 21 (not shown) is moved, thus moving the cartridge tray 22 so that the cartridge 2A is aligned with the stopper remove-and-replace mechanism 24 as will be discussed further below. In FIG. 8 the cartridge tray 22 has been moved so that the cartridge 2A is already in alignment. As indicated by the arrow "A2" in FIG. 8, the carriage 59 of the stopper remove-and-replace mechanism is de-elevated.

Figure 9:
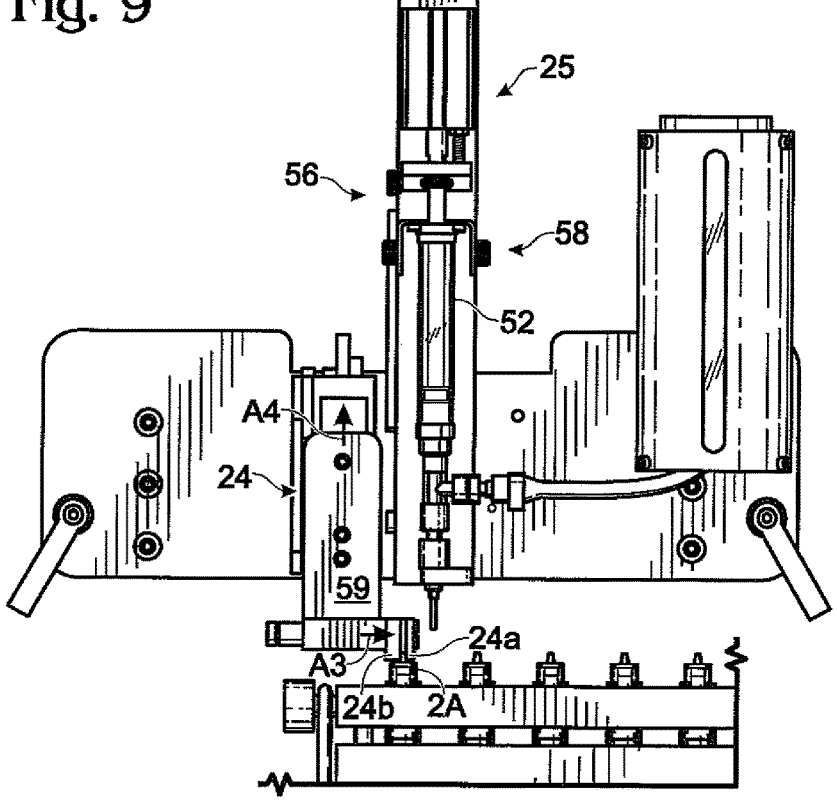
FIG. 9 is a broken elevation view of the apparatus of FIG. 2, at a second instant of operation thereof according to the invention, subsequent to the first instant of operation shown in FIG. 8.

As indicated by the arrow "A3" in FIG. 9, the moveable jaw 24b moves toward the fixed jaw 24a so as to close on and thereby obtain a grip on the stopper 6 of the cartridge 4A, particularly at the stem 6a of the stopper. After the stopper has been gripped, the carriage 59 is re-elevated as indicated by the arrow "A4" to achieve the position shown in FIG. 10.

Figure 10:
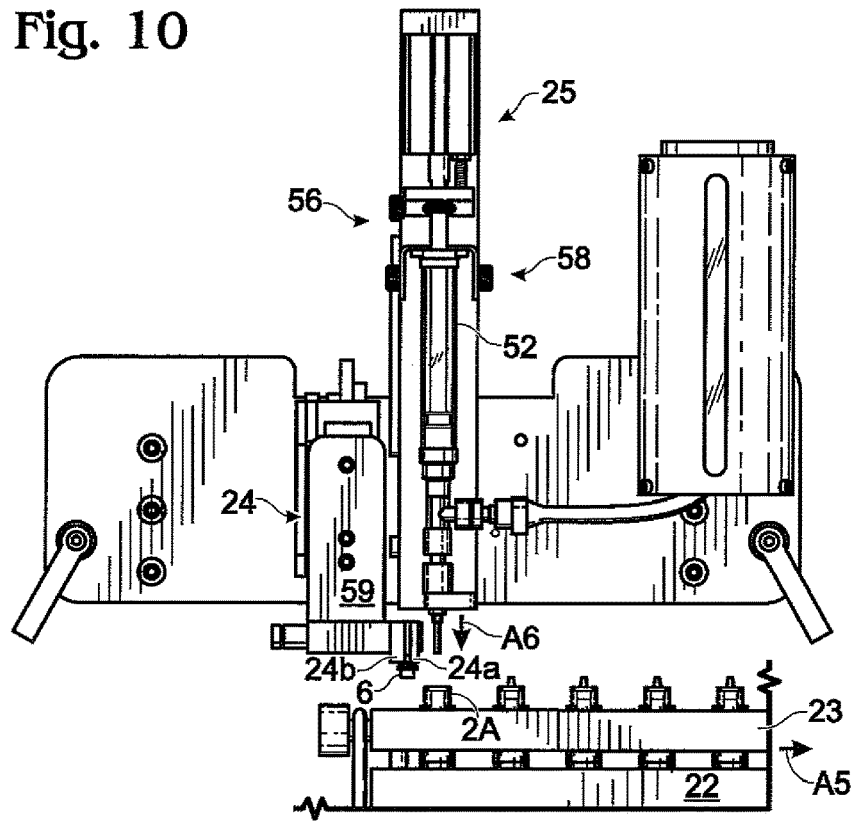
FIG. 10 is a broken elevation view of the apparatus of FIG. 2, at a third instant of operation thereof according to the invention, subsequent to the second instant of operation shown in FIG. 9.

As indicated by the arrow "A5" in FIG. 10, the X-Y table 21 is moved, thus moving the cartridge tray 22, so that the cartridge 2A is aligned with the liquid injection mechanism 25. Also, as indicated by the arrow "A6" in FIG. 10, the carriage 57 of the liquid injection mechanism is de-elevated so as to introduce the needle 39 to the fill opening 4 of the cartridge 2A with the result shown in FIG. 11.

Figure 11:
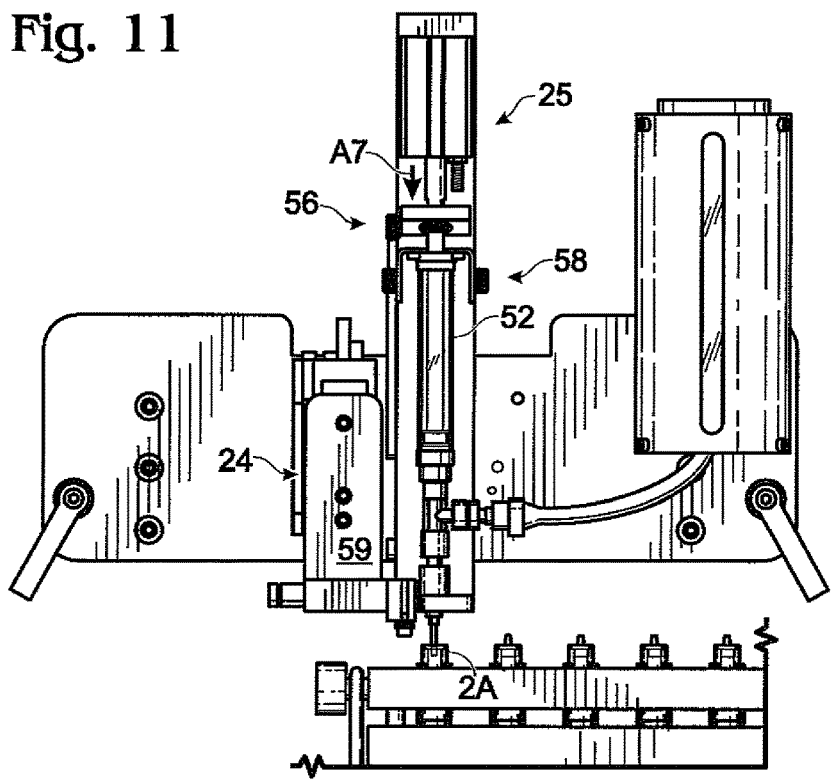
FIG. 11 is a broken elevation view of the apparatus of FIG. 2, at a fourth instant of operation thereof according to the invention, subsequent to the third instant of operation shown in FIG. 10.

As indicated by the arrow "A7" in FIG. 11, the receiver 56 is de-elevated relative to the receiver 58 to expel the liquid out of the syringe 52 through the needle 39 and into the cartridge 2A.

Also as will be readily appreciated, at least portions of movements described above may be occurring simultaneously.

The process of reinstalling the stopper is the reverse of the process of removing it, and includes moving the X-Y table back to where it was in FIG. 8, in the direction opposite that of the arrow "A5" in FIG. 10.

The cartridges may be indexed to the filling apparatus 20 by an operator of the apparatus putting the X-Y table 21 into a "free-wheeling" mode, and resting the stopper stem 6a of one of the cartridges against the inside face $24a_{INSIDSE}$ of the fixed jaw 24a. Since the lateral spacing, measured perpendicular to the direction of stroke, between the stopper remove-and-replace mechanism 24 and the liquid injection mechanism 25, is fixed, and with fixed increments of movement of the X-Y table 21 between adjacent cartridges being provided as a result of arranging the holes 40 in a regular array, this indexing process establishes, ideally, the only reference that is needed for aligning the X-Y table with the stopper remove-and-replace mechanism 24 and the liquid injection mechanism 25.

In practice, a consequence of providing one fixed jaw and one moveable jaw in the stopper remove-and-replace mechanism 24 is that the center-line of the stopper 6 (FIG. 1) will be spaced laterally (in the X-direction in FIG. 1) from the fixed jaw an amount that will vary slightly depending on variances in the outer diameter $D_4$ (FIG. 1 and associated text) of the stopper stem 6a. With a fixed lateral spacing, measured perpendicular to the direction of stroke, between the stopper remove-and-replace mechanism 24 and the liquid injection mechanism 25, and with fixed increments of movement of the X-Y table 21 between adjacent cartridges, this variation in the location of the center-line of the stopper means that aligning the stopper remove-and-replace mechanism 24 with any given cartridge may not result in a perfect alignment of the liquid injection mechanism 25 with the same cartridge. If, for example, the stopper stem is thicker than average, the center-line of the cartridge will be positioned laterally farther from the fixed jaw 24a, and therefore laterally farther from the liquid injection mechanism 25, than it would normally be.

It has been found that this variation can be accounted for by initially indexing the X-Y table 21 by centering a cartridge under the liquid injection mechanism 25, and then allowing the operator to enter, e.g., through the user interface 30, an offset in the location of the table as needed for centering the same cartridge under the stopper remove-and-replace mechanism 24.

The elevation limits for the carriages 57 and 59 may be adjustable to allow for filling cartridges of varying lengths L (FIG. 1). While, as noted, these limits may be imposed mechanically, they could alternatively be imposed by the controller.

As can be readily appreciated and straightforwardly achieved by persons of ordinary skill, the controller is programmed or otherwise configured or adapted to control the e-cigarette vaporizer cartridge filling apparatus 20 to perform all the functions described herein. This may advantageously include responding to one or more proximity or other sensors (not shown) provided with the apparatus for sensing: (1) that the carriage 59 of the stopper remove-and-replace mechanism has bottomed and the moveable jaw 24b has closed to within a predetermined maximum allowable distance from the fixed jaw 24a, indications of which allow for inferring that the stopper has been gripped; (2) that the carriage 59 has thereafter elevated, indication of which allows for inferring that the stopper has been removed and the cartridge is ready to fill; and (3) that, after the position of the X-Y table has been incremented, the carriage 57 of the liquid injection mechanism 25 has bottomed, indication of which allows for inferring that there was no obstruction to prevent the needle 39 from being disposed to effectively deliver injected liquid to the cartridge, which allows for refraining from making an injection if it has not, and thus avoiding a waste of valuable liquid.

In response to a failure to acquire any of these indications, the controller may stop the apparatus and/or issue an error signal or message.

Alternatively, open loop control may be used in place of sensor feedback by means of timers.

The controller may apply fixed X-Y table increments that are appropriate for the cartridge tray 22 in use. These may be selected from a menu presented on the user interface 30. The user interface 30 may also be used to allow the operator of the apparatus to adjust the aforementioned offset.

It is considered to be an outstanding feature of the filling apparatus 20 that the controller and user interface allow the operator to adjust the dwell time for filling the syringe ("filling dwell time"), and thereby optimize the dwell time so that the throughput of the cartridge filling apparatus is maximized.

A proximity or similar sensor (not shown) may be used to provide an indication to the controller that the receiver 58 has moved away from the receiver 56, so that the liquid injection syringe 52 is drawing liquid from the liquid reservoir 26. Having received this indication, the controller waits a filling dwell time, say 5 seconds, to give the liquid, which may be highly viscous, time to enter the syringe and to re-absorb gas bubbles that came out of solution as a result of the liquid encountering the vacuum in the liquid injection syringe 52 creating by pulling the plunger 52b relative to the body 52a, as a result of elevating the receiver 58 relative to the receiver 56 of the liquid injection mechanism 25. Failure to wait a sufficient time would result in incomplete fillings.

It is recognized that the desired filling dwell time is established by the disappearance of bubbles in a viscous liquid like *cannabis* oil, a condition which can be seen by an operator of the cartridge filling apparatus. The filling dwell time will be highly influenced by the temperature of the liquid reservoir 26, and the length of time the apparatus has been in use, which at least greatly contributes to governing whether the liquid in the liquid reservoir has reached an equilibrium temperature, and will be secondarily influenced by the temperatures of the various components in the liquid delivery and flow control element. A number of variables are involved.

An optimum "filling dwell time" may be established by use of a vision system or other optical sensing apparatus for sensing the condition that there are no longer bubbles in the liquid in the liquid injection syringe 52, and when this condition occurs. The arrival of this condition could also be sensed acoustically. The arrival of this condition, once sensed, may be used to automatically adjust the filling dwell time so that the end of the filling dwell time substantially coincides with the arrival of the condition.

But it is considered to be more reliable and cost effective to allow the operator to adjusting the filling dwell time by an iterative selection of adjustments that will tend to converge upon the optimum dwell time as the filling process progresses, rather than to provide for a fixed filling dwell time, or to try to automate an adjustment.

To provide this feature, at least that portion of the liquid injection syringe 52 which is intended to be filled is preferably transparent and is disposed within the operator's line of sight, so that the operator can see the bubbles and the disappearances thereof, and the controller is preferably configured or adapted to receive instructions from the operator to make the adjustments in filling dwell time, for example by incrementing or decrementing a preset or existing value of filling dwell time in 0.1 second steps, such as by the operator choosing a desired amount of adjustment, or a series of iterative or consecutive adjustments, from a menu displayed on the user interface 30.

The controller also preferably provides, and allows for adjusting an "end-of-filling" dwell time, which commences after the receivers 58 and 56 of the liquid injection mechanism 25 have been brought in closest proximity, so that the contents of the liquid injection syringe 52 have been expelled from the syringe to the maximum degree intended. The end-of-filling dwell time is to ensure that the cartridge being filled is not moved away from the fill position while liquid may still be dripping or drooling from the needle 39.

The controller and user interface are preferably configured or adapted to allow for the operator to adjust the filling and end-of-filling dwell times similar to what has been described above for making similar adjustments, as will be readily appreciated by persons of ordinary skill.

While in the preferred embodiment, the stopper remove-and-replace mechanism 24 and the liquid injection mechanism 25 are fixedly disposed and the cartridges are moved to these mechanisms by the X-Y table 21, the cartridges could be fixedly disposed and the mechanisms could be moved to the cartridges by similar means. Either the gantry 32 on which these mechanisms are mounted could be moved, or the two mechanisms could be moved independently. If the liquid injection mechanism 25 in particular were to be moved to the cartridges rather than the other way around, it would be preferable to move the liquid reservoir 26 along with it, to maintain a minimal tubing length between the two elements.

Figure 12:
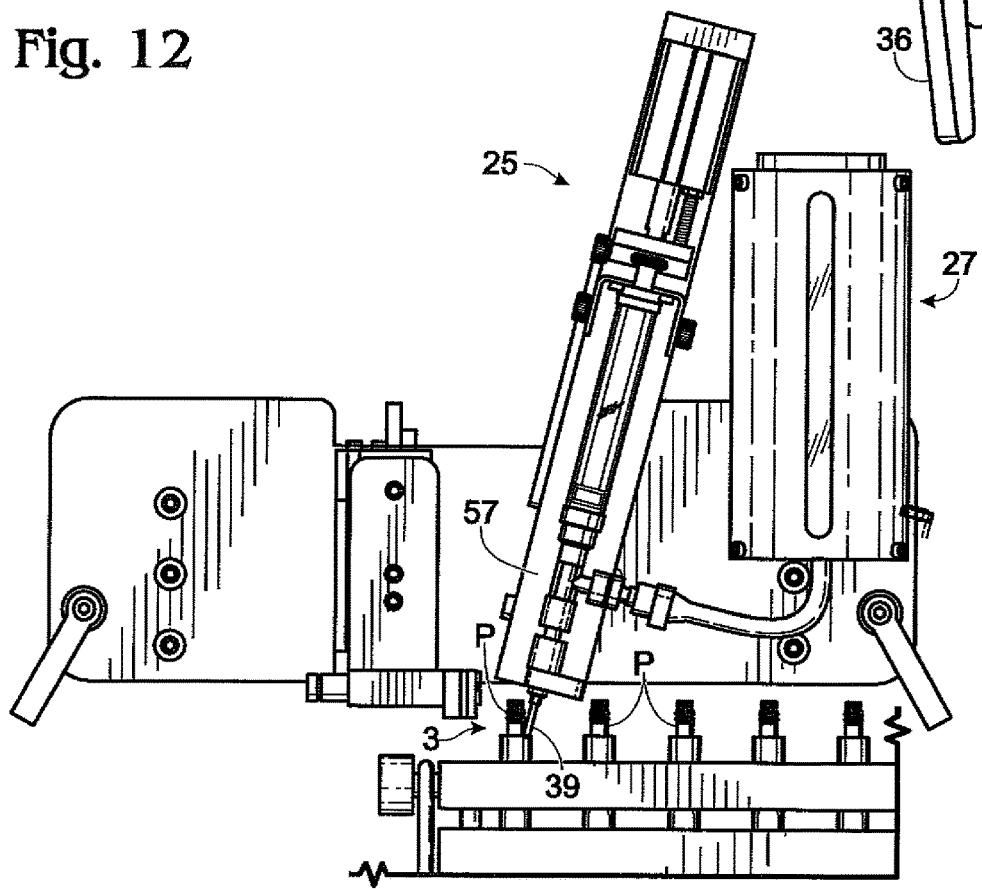
FIG. 12 is a broken elevation of the apparatus of FIG. 2, showing the liquid injection mechanism re-oriented according to the invention for filling a post style vaporizer cartridge.

FIG. 12 shows the liquid injection mechanism 25 configured or adapted for injecting liquid into a "post cap" style 3 of vaporizer cartridge. This style of cartridge does not have a stopper, and the fill opening is an annular ring extending around an externally threaded post "P." To best insert the needle 39 into or near enough to the fill opening to fill the cartridge, while avoiding interference with the post, the carriage 57 of the liquid injection mechanism is removably mounted to the gantry 32 by use of thumb screws (not shown), inserted through the backside of the gantry through mounting holes "MH" (see FIG. 7), that engage threaded holes (not visible) in the carriage 57. This permits re-orienting the direction of stroke for the liquid injection mechanism by an angle θ (FIG. 7) which is optimally 15 degrees, and preferably in the range of about 13-17 degrees. For example, for orienting the liquid injection mechanism 25 for filling cartridges of the type shown in FIG. 1, along the Z direction, the mounting holes $MH_1$ and $MH_2$ may be used; whereas for re-orienting the mechanism for filling the post style cartridge, the mounting holes $MH_1$ and $MH_3$ may be used.

A manual version of the filling apparatus 20, omitting the X-Y table 21, the stopper remove-and-replace mechanism 24, the carriage 57 of the liquid injection mechanism 25, the cartridge tray 22, the cartridge alignment guide 23, and the user interface 30 may be provided according to the invention. Without the moving carriage 57, the needle 39 of the liquid injection mechanism is stationary and the user may manually introduce the cartridge to be filled to the needle, at the desired angle, for filling.

A foot pedal operated momentary (so long as foot pressure is applied) toggling pneumatic switch receives pressurized source air and directs it, depending on whether the switch is depressed or not, to one or the other of the two inputs In1 and In2 to the pneumatic linear actuator $PLN1_{25}$ shown in FIG. 6. In particular, when the pedal is depressed, the source air is applied to the input that causes the receiver to de-elevate, and when the operator ceases to depress the pedal, the source air is applied to the other input which allows the receiver to elevate of its own accord, for drawing more liquid into the syringe.

Due to the fact that there need be no carriage movement of the liquid injection mechanism 25 in the manual version, the liquid travel distance between the outlet end 26a of the liquid reservoir 26 and the output end 53 of the syringe can be shortened by up to about 2 inches from the distances described above for the apparatus 20. This implies that the length of the tubing 43 can likewise be shortened by up to about 2 inches, so while a preferred maximum tubing length of about 5 inches maybe provided in the apparatus 20, the corresponding preferred maximum tubing length in the manual version may be 3 inches. As noted previously, minimizing this tubing length is highly advantageous, particularly where the liquid is very viscous. The opportunity to more greatly minimize the distance between the tubing length in the manual version makes it particularly desirable for filling cartridges with highly viscous liquid, such as *cannabis* oil.

It is to be understood that, while a specific e-cigarette vaporizer cartridge filling method and apparatus has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An apparatus for dispensing a liquid into at least one container for use in a vaporizer device, the apparatus comprising:
   a liquid reservoir having an outlet end, the liquid reservoir for containing the liquid;
   a heater for heating the liquid in the liquid reservoir to a temperature of at least about 100 degrees Fahrenheit so as to produce heated liquid; and
   a liquid injection mechanism having an output end, the liquid injection mechanism configured for drawing a portion of the heated liquid from the outlet end of the liquid reservoir and dispensing said portion from the output end of the liquid injection mechanism into the at least one container, wherein the liquid must travel no farther than about 10 inches between the outlet end of the liquid injection mechanism and the output end of the liquid reservoir.

2. The apparatus of claim 1, for filling a plurality of containers for use in one or more vaporizer devices, the liquid injection mechanism configured for sequentially drawing multiple portions of the heated liquid from the outlet end of the liquid reservoir and sequentially dispensing said multiple portions from the output end of the liquid injection mechanism into respective ones of the containers, the apparatus further comprising:
   an X-Y positionable element;
   a controller for controlling the X-Y position of the X-Y positionable element; and
   a tray with a plurality of wells, the wells adapted for holding respective ones of the containers in respective filling positions, the wells arranged in a pattern defining a regular X-Y array, either the liquid injection mechanism or the tray being carried by the X-Y positionable element and therefore being X-Y positionable as a result of control exerted by the controller upon the X-Y positionable element so as to provide for sequentially performing a series of steps of receiving the dispensed portions by the respective ones of the containers.

3. The apparatus of claim 2, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

4. The apparatus of claim 3, the holes having respective hole axes about which the holes are centered, the holes defining in a progressive sequence of cross-sections of the container alignment guide taken perpendicular to the respective hole axes, either progressively increasing or progressively decreasing void areas.

5. The apparatus of claim 1, wherein the liquid must travel no farther than about 8 inches between the outlet end of the liquid injection mechanism and the output end of the liquid reservoir.

6. The apparatus of claim 1, wherein the liquid must travel no farther than about 7 inches between the outlet end of the liquid injection mechanism and the output end of the liquid reservoir.

7. An apparatus for dispensing a liquid into at least one container for use in a vaporizer device, the apparatus comprising:
   a liquid reservoir having an outlet end, the liquid reservoir for containing the liquid;
   a heater for heating the liquid in the liquid reservoir to a temperature of at least about 100 degrees Fahrenheit so as to produce heated liquid;
   a liquid injection mechanism having an output end, the liquid injection mechanism configured for drawing a portion of the heated liquid from the outlet end of the liquid reservoir and dispensing said portion from the output end of the liquid injection mechanism; and
   a liquid delivery and flow control element having a dispense outlet and one or more check valves, the liquid injection mechanism configured for drawing said portion through the liquid delivery and flow control element and dispensing said portion through the dispense outlet into the at least one container, wherein the one or more check valves allow for the heated liquid to flow from the liquid reservoir to the liquid injection mechanism but not the reverse, and wherein the one or more check valves further allow for the heated liquid to flow from the output end of the liquid injection mechanism and out the dispense outlet but not the reverse.

8. The apparatus of claim 7, further comprising one or more auxiliary heating devices adapted to produce primarily radiant heat, each of the one or more auxiliary heating devices being disposed at ends of respective support members allowing at least 5 degrees of freedom of adjustment of the respective auxiliary heating devices so that the auxiliary heating devices may be selectably arranged to be in close proximity to the liquid delivery and flow control element, and so that the heat energy produced thereby may be aimed at or focused on the liquid delivery and flow control element.

9. The apparatus of claim 8, wherein the one or more check valves have an input end for receiving incoming liquid flow, the apparatus further comprising a length of hollow tubing for conducting the heated liquid from the outlet end of the liquid reservoir to the input end of the one or more check valves, wherein the length of said tubing is no more than about 8 inches.

10. The apparatus of claim 9, wherein the length of said tubing is no more than about 8 inches.

11. The apparatus of claim 9, wherein the length of said tubing is no more than about 7 inches.

12. The apparatus of claim 7, for filling a plurality of containers for use in one or more vaporizer devices, the liquid injection mechanism configured for sequentially drawing multiple portions of the heated liquid from the outlet end of the liquid reservoir and sequentially dispensing said multiple portions from the output end of the liquid injection mechanism into respective ones of the containers, the apparatus further comprising:
   an X-Y positionable element;
   a controller for controlling the X-Y position of the X-Y positionable element; and
   a tray with a plurality of wells, the wells adapted for holding respective ones of the containers in respective filling positions, the wells arranged in a pattern defining a regular X-Y array, either the liquid injection mechanism or the tray being carried by the X-Y positionable element and therefore being X-Y positionable as a result of control exerted by the controller upon the X-Y positionable element so as to provide for sequentially performing a series of steps of receiving the dispensed portions by the respective ones of the containers.

13. The apparatus of claim 12, further comprising one or more auxiliary heating devices adapted to produce primarily radiant heat, each of the one or more auxiliary heating devices being disposed at ends of respective support members allowing at least 5 degrees of freedom of adjustment of the respective auxiliary heating devices so that the auxiliary heating devices may be selectably arranged to be in close proximity to the liquid delivery and flow control element, and so that the heat energy produced thereby may be aimed at or focused on the liquid delivery and flow control element.

14. The apparatus of claim 13, wherein the one or more check valves have an input end for receiving incoming liquid flow, the apparatus further comprising a length of hollow tubing for conducting the heated liquid from the outlet end of the liquid reservoir to the input end of the one or more check valves, wherein the length of said tubing is no more than about 8 inches.

15. The apparatus of claim 14, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

16. The apparatus of claim 15, the holes having respective hole axes about which the holes are centered, the holes defining in a progressive sequence of cross-sections of the container alignment guide taken perpendicular to the respective hole axes, either progressively increasing or progressively decreasing void areas.

17. The apparatus of claim 14, wherein the length of said tubing is no more than about 6 inches.

18. The apparatus of claim 14, wherein the length of said tubing is no more than about 5 inches.

19. The apparatus of claim 13, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

20. The apparatus of claim 19, the holes having respective hole axes about which the holes are centered, the holes defining in a progressive sequence of cross-sections of the container alignment guide taken perpendicular to the respective hole axes, either progressively increasing or progressively decreasing void areas.

21. The apparatus of claim 12, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

22. The apparatus of claim 21, the holes having respective hole axes about which the holes are centered, the holes defining in a progressive sequence of cross-sections of the container alignment guide taken perpendicular to the respective hole axes, either progressively increasing or progressively decreasing void areas.

23. An apparatus for dispensing a liquid into at least one container for use in a vaporizer device, the containers having respective stoppers, the apparatus comprising:
an X-Y positionable element;
a controller for controlling the X-Y position of the X-Y positionable element; and
a tray with a plurality of wells, the wells adapted for holding respective ones of the containers in respective filling positions, the wells arranged in a pattern defining a regular X-Y array;
a liquid reservoir having an outlet end, the liquid reservoir for containing the liquid;
a heater for heating the liquid in the liquid reservoir to a temperature of at least about 100 degrees Fahrenheit so as to produce heated liquid;
a liquid injection mechanism having an output end, the liquid injection mechanism configured for sequentially drawing multiple portions of the heated liquid from the outlet end of the liquid reservoir and sequentially dispensing said multiple portions from the output end of the liquid injection mechanism, either the liquid injection mechanism or the tray being carried by the X-Y positionable element and therefore being X-Y positionable as a result of control exerted by the controller upon the X-Y positionable element so as to provide for sequentially performing a series of steps of receiving the dispensed portions by the respective ones of the containers; and
a stopper remove-and-replace mechanism having a carriage carrying a set of opposable jaws, the jaws adapted for sequentially closing and thereby sequentially performing a series of steps of gripping the stoppers of the respective ones of the containers, the carriage adapted for elevating after each step of gripping and thereby sequentially performing a series of steps of removing the stoppers from the respective ones of the containers, the carriage further adapted for de-elevating after each step of removing and thereby sequentially performing a series of steps of re-installing the stoppers in the respective ones of the containers, the jaws further adapted for opening after each step of re-installing and thereby sequentially performing a series of steps of releasing the stoppers of the respective ones of the containers, the controller configured to provide that each one of the steps of receiving be preceded by a corresponding one of the steps of removing and followed by a corresponding one of the steps of re-installing.

24. The apparatus of claim 23, further comprising a liquid delivery and flow control element having a dispense outlet and one or more check valves, the liquid injection mechanism drawing said portions through the liquid delivery and flow control element and dispensing said portions through the dispense outlet, wherein the one or more check valves allow for the heated liquid to flow from the liquid reservoir to the liquid injection mechanism but not the reverse, and wherein the one or more check valves further allow for the heated liquid to flow from the output end of the liquid injection mechanism and out the dispense outlet but not the reverse.

25. The apparatus of claim 24, wherein the one or more check valves have an input end for receiving incoming liquid flow, the apparatus further comprising a length of hollow tubing for conducting the heated liquid from the outlet end of the liquid reservoir to the input end of the one or more check valves, wherein the length of said tubing is no more than about 8 inches.

26. The apparatus of claim 25, further comprising one or more auxiliary heating devices adapted to produce primarily radiant heat, each of the one or more auxiliary heating devices being disposed at ends of respective support members allowing at least 5 degrees of freedom of adjustment of the respective auxiliary heating devices so that the auxiliary heating devices may be selectably arranged to be in close proximity to the tubing, and so that the heat energy produced thereby may be aimed at or focused on the tubing.

27. The apparatus of claim 26, further comprising one or more auxiliary heating devices adapted to produce primarily radiant heat, each of the one or more auxiliary heating devices being disposed at ends of respective support members allowing at least 5 degrees of freedom of adjustment of the respective auxiliary heating devices so that the auxiliary heating devices may be selectably arranged to be in close proximity to the liquid delivery and flow control element, and so that the heat energy produced thereby may be aimed at or focused on the liquid delivery and flow control element.

28. The apparatus of claim 27, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

29. The apparatus of claim 28, the holes having respective hole axes about which the holes are centered, the holes defining in a progressive sequence of cross-sections of the container alignment guide taken perpendicular to the respective hole axes, either progressively increasing or progressively decreasing void areas.

30. The apparatus of claim 26, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

31. The apparatus of claim 30, the holes having respective hole axes about which the holes are centered, the holes defining in a progressive sequence of cross-sections of the container alignment guide taken perpendicular to the respective hole axes, either progressively increasing or progressively decreasing void areas.

32. The apparatus of claim 25, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

33. The apparatus of claim 32, the holes having respective hole axes about which the holes are centered, the holes defining in a progressive sequence of cross-sections of the container alignment guide taken perpendicular to the respective hole axes, either progressively increasing or progressively decreasing void areas.

34. The apparatus of claim 25, wherein the length of said tubing is no more than about 6 inches.

35. The apparatus of claim 25, wherein the length of said tubing is no more than about 5 inches.

36. The apparatus of claim 24, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

37. The apparatus of claim 36, the holes having respective hole axes about which the holes are centered, the holes defining in a progressive sequence of cross-sections of the container alignment guide taken perpendicular to the respective hole axes, either progressively increasing or progressively decreasing void areas.

38. The apparatus of claim 23, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

39. The apparatus of claim 38, the holes having respective hole axes about which the holes are centered, the holes defining in a progressive sequence of cross-sections of the container alignment guide taken perpendicular to the respective hole axes, either progressively increasing or progressively decreasing void areas.

40. An apparatus for dispensing a liquid into at least one container for use in a vaporizer device, the apparatus comprising:
  a liquid reservoir having an outlet end, the liquid reservoir for containing the liquid;
  a heater for heating the liquid in the liquid reservoir to a temperature of at least about 100 degrees Fahrenheit so as to produce heated liquid; and
  a liquid injection mechanism having an output end, the liquid injection mechanism configured for sequentially drawing multiple portions of the heated liquid from the outlet end of the liquid reservoir and sequentially dispensing said multiple portions from the output end of the liquid injection mechanism into respective ones of the containers; and
  a controller, wherein the liquid injection mechanism draws said portions of heated liquid during respective periods of time, wherein the liquid injection mechanism is configured to allow a human operator of the apparatus to perform a visual observation of the formation and collapse of bubbles in the drawn portions of heated liquid, and wherein the controller is configured to provide that the human operator may adjust the periods of time in response to the visual observation.

41. The apparatus of claim 40, further comprising:
  an X-Y positionable element, wherein the controller is further configured for controlling the X-Y position of the X-Y positionable element; and
  a tray with a plurality of wells, the wells adapted for holding respective ones of the containers in respective filling positions, the wells arranged in a pattern defining a regular X-Y array, the liquid injection mechanism configured for sequentially drawing multiple portions of the heated liquid from the outlet end of the liquid reservoir and sequentially dispensing said multiple portions from the output end of the liquid injection mechanism, either the liquid injection mechanism or the tray being carried by the X-Y positionable element and therefore being X-Y positionable as a result of control exerted by the controller upon the X-Y positionable element so as to provide for sequentially performing a series of steps of receiving the dispensed portions by the respective ones of the containers.

42. The apparatus of claim 41, further comprising a container alignment guide having a first side and an opposite, second side which is parallel to the first side, and a plurality of holes extending through the container alignment guide from the first side to the second side, the holes arranged in substantially the same pattern as the wells of the tray, each hole defining a larger void surface area on the first side than on the second side.

43. The apparatus of claim 42, the holes having respective hole axes about which the holes are centered, the holes defining in a progressive sequence of cross-sections of the container alignment guide taken perpendicular to the respective hole axes, either progressively increasing or progressively decreasing void areas.

44. A method for dispensing a liquid into at least one container for use in a vaporizer device, the method comprising:
providing a liquid reservoir having an outlet end, the liquid reservoir for containing the liquid;
heating the liquid in the liquid reservoir to a temperature of at least about 100 degrees Fahrenheit so as to produce heated liquid using primarily conductive heat transfer;
drawing a portion of the heated liquid from the outlet end of the liquid reservoir through a delivery and flow control element;
heating said portion while said portion is in the delivery and flow control element using primarily radiant heat transfer; and
dispensing said portion into the at least one container.

45. The method of claim 44, wherein said step of drawing occurs over a period of time and is sequentially repeated, for filling a plurality of the containers, the method further comprising performing a step of visual observation of the formation and collapse of bubbles in at least one of the drawn portions of heated liquid, and adjusting the periods of time in response to the visual observation.

46. The method of claim 45, wherein the steps of performing a visual observation and adjusting the periods of time are performed by a human.

47. A method for filling a plurality of containers for use in one or more vaporizer devices with liquid, comprising:
providing a liquid reservoir having an outlet end, the liquid reservoir for containing the liquid;
heating the liquid in the liquid reservoir to a temperature of at least about 100 degrees Fahrenheit so as to produce heated liquid;
sequentially drawing multiple portions of the heated liquid from the outlet end of the liquid reservoir through a delivery and flow control element over respective periods of time;
performing a step of visual observation of the formation and collapse of bubbles in at least one of the sequentially drawn portions of heated liquid; and
adjusting the periods of time in response to the visual observation.

48. The method of claim 47, wherein the steps of performing a visual observation and adjusting the periods of time are performed by a human.

* * * * *